United States Patent
Saar et al.

(10) Patent No.: US 7,480,635 B2
(45) Date of Patent: Jan. 20, 2009

(54) METHOD FOR FINANCING MULTIMEDIA CONTENT THROUGH ADVERTISING

(75) Inventors: Eva Saar, Griesheim (DE); Joerg Schwenk, Henfenfeld (DE)

(73) Assignee: Deutsche Telekom AG, Bonn (DE)

( * ) Notice: Subject to any disclaimer, the term of this patent is extended or adjusted under 35 U.S.C. 154(b) by 863 days.

(21) Appl. No.: 10/363,125

(22) PCT Filed: Aug. 10, 2001

(86) PCT No.: PCT/EP01/09237

§ 371 (c)(1),
(2), (4) Date: Jul. 14, 2003

(87) PCT Pub. No.: WO02/19710

PCT Pub. Date: Mar. 7, 2002

(65) Prior Publication Data

US 2004/0028226 A1    Feb. 12, 2004

(30) Foreign Application Priority Data

Sep. 1, 2000   (DE) .............................. 100 44 051

(51) Int. Cl.
*H04K 1/00* (2006.01)
*H04L 9/00* (2006.01)
*G06Q 30/00* (2006.01)
*G07G 1/14* (2006.01)

(52) U.S. Cl. .............................. 705/50; 705/78; 705/14; 705/51; 705/26; 348/E7.07

(58) Field of Classification Search ............. 705/50–59, 705/14, 26
See application file for complete search history.

(56) References Cited

U.S. PATENT DOCUMENTS 5,555,308 A * 9/1996 Levien ........................ 705/51
6,493,043 B1 * 12/2002 Bollmann et al. ...... 348/E5.101

FOREIGN PATENT DOCUMENTS

DE    19813784    9/1999

(Continued)

OTHER PUBLICATIONS

Cox et al "Some general methods for tampering with watermarks" IEEE Journal on Communications, May 1998, pp. 587-593.*
TV-Anytime Forum web site, "About the TV-Anytime Forum", Mar. 19, 2003 Update, http://www.tv-anytime.org/about/index.html, p. 1, Aug. 4, 2004.
DVD Forum web site, "DVD Forums Mission", 2003 DVD Forum, http://www.dvdforum.com/about-mission.htm, pp. 1-2, Aug. 4, 2004.

(Continued)

*Primary Examiner*—Calvin Loyd Hewitt, II
*Assistant Examiner*—Cristina Owen Sherr
(74) *Attorney, Agent, or Firm*—Darby & Darby

(57) ABSTRACT

A method for financing multimedia content through advertising includes playing back advertising blocks between uses of the content so to finance use of the content by the advertising. Code elements of a key are embedded in predefined locations in the advertising blocks, the key being configured for decryption of the content that follows. The embedded code elements are scanned and collected during the playback of the advertising blocks. The code elements are linked schematically to form the key. The content is encrypted using the key so that a use of the content depends on at least one of a subset of the code elements determined by the advertiser and the key.

20 Claims, 1 Drawing Sheet

FOREIGN PATENT DOCUMENTS

| | | | |
|---|---|---|---|
| JP | 10164550 | * | 4/1996 |
| JP | 10164550 | | 6/1998 |
| WO | 9930498 | | 6/1999 |
| WO | 9941900 | | 8/1999 |

OTHER PUBLICATIONS

Beutelsbacher et al. "Modeme Verfahren der Kryptographie" $2^{nd}$ Edition, 1998, pp. 68-71 (translation enclosed).

* cited by examiner

METHOD FOR FINANCING MULTIMEDIA CONTENT THROUGH ADVERTISING

BACKGROUND

The present invention relates generally to a method for financing multimedia content through advertising by playing back advertising blocks between uses of the content, and in particular to a method for financing multimedia content in which code elements of a key are embedded in predefined locations in the advertising blocks.

Methods for financing multimedia content through advertising by playing back advertising blocks between uses of the content are known in general from advertising-financed free TV, where they are widespread and are used by advertisers who wish to finance the presentation of useful data by presenting mixed-in sequences of advertising blocks.

The distribution of media is often financed by advertising breaks. This is not a problem today in the area of television, because the customer cannot "fast forward" a television broadcast. The custom of "zapping" is taken into account by broadcasters by extensive synchronization of advertising.

The situation is different in the area of recorded content, e.g., when television broadcasts are recorded on videocassettes, where the user often has the option of bypassing the advertising by fast forwarding the videotape until the advertising is terminated. This problem occurs mainly in the video area but is also conceivable for other media (CDs, DVDs).

This problem obtains a new dimension with a development which is bundled by the "TV Anytime" standardization initiative (http://www.tv-anvtime.org/): In the future, television sets, video recorders and/or set-top boxes will contain memory media (e.g., hard drives with a capacity of 50 to 100 Gigabytes) which will make it possible to record and play back the content simultaneously as desired. This will make it much easier for the customer to skip the advertising breaks:

The customer will record about 15 minutes of the broadcast.

Then he will begin to watch it.

Whenever an advertising break occurs, he will skip the break and will start again after the break.

Protection of content was an important concern of the DVD standardization forum (www.dvdforum.com). Therefore, an encryption system (content scrambling system, CSS) has been specified for DVD. According to this system, a header preceding each data block on the DVD contains the title key encrypted with the disk key. Using this title key and a few extra bits, it is then possible to decrypt the content of the file.

SUMMARY OF THE INVENTION

An object of this invention is to provide a method and a device with which it will be possible to ensure that the advertising must in fact be played back. (It is of course impossible to force the customer to watch it.) This method will also make possible new types of marketing for advertising-financed content.

The present invention provides a method for financing multimedia content through advertising. The method includes: playing back advertising blocks between uses of the content so to finance use of the content by the advertising; embedding code elements of a key in predefined locations in the advertising blocks, the key being configured for decryption of the content that follows; scanning and collecting the embedded code elements during the playing back of the advertising blocks; linking the code elements schematically to form the key; and encrypting the content using the key so that a use of the content depends on at least one of a subset of the code elements determined by the advertiser and the key.

BRIEF DESCRIPTION OF THE DRAWING

The present invention is described in greater detail below based on exemplary embodiments with reference to the drawing, in which.

DETAILED DESCRIPTION

Figure 1:
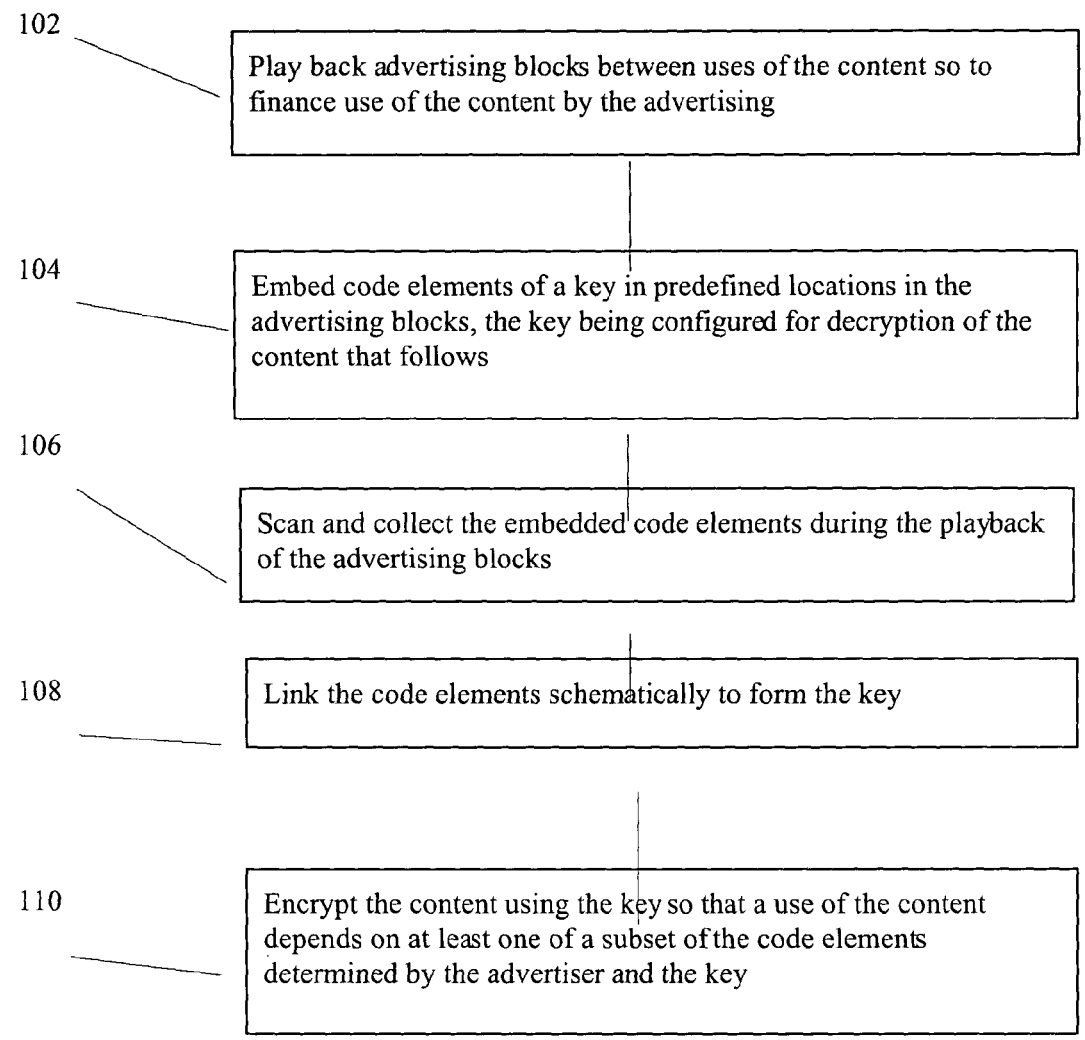
FIG. 1 shows a block diagram of a method according to the present invention for financing multimedia content through advertising.

Referring to FIG. 1, according to a method for financing multimedia content through advertising, advertising blocks are played back between uses of the content so to finance use of the content by the advertising (see block 102). Code elements of a key are embedded in predefined locations in the advertising blocks, the key being configured for decryption of content that follows (see block 104). The embedded code elements are scanned and collected during the playing back of the advertising blocks (see block 106). The code elements are linked schematically to form the key (see block 108). The content is encrypted using the key so that a use of the content depends on at least one of a subset of the code elements determined by the advertiser and the key (see block 110).

The method according to the invention divides content (e.g., a film) into various blocks, each being encrypted with a title key. Then unencrypted advertising blocks containing the key are inserted before and between these blocks. A playback device must scan most or even all of the advertising block to arrive at the key. A few variants are described as possible implementations below.

The simplest possibility is to conceal the entire title key in the advertising block at a randomly selected point in time. The playback device must then scan approximately half the advertising block on the average to find the key. Dividing the key into two code elements which are distributed at random points in time in the first and second halves of the advertising block forces scanning to be continued over a longer period of time, which increases in proportion to the division into more code elements.

Another possibility is to break down the title key into several partial secret codes, which are concealed in the advertising block using secret sharing schemes. These are schemes in which one must have multiple partial secret codes, which are then combined to form a complete secret code (literature: Beutelspacher, Schwenk, Wolfenstetter, Moderne Verfahren der Kryptographie [Modem Methods of Cryptography], Vieweg Verlag, $3^{rd}$ edition, 2000).

This principle greatly prolongs the amount of time required for scanning the advertising block by introducing a partial secret code into the data at certain intervals (e.g., in each advertising spot or every 10 seconds). These partial secret codes are then collected during playback, e.g., by the playback device.

The useful data file following is then encrypted by using the complete secret code as the title key and is then displayed only when a sufficient number of partial secret codes have been collected.

The conditions under which this is the case will depend on the secret sharing scheme used. Variations in which all or only a portion of the advertising must run are conceivable, in which case one portion may be obligatory and other portions may be optional.

Other variants of the method may be appropriate with regard to the completeness of the code elements.

The variant in which all the partial secret codes must be collected is appropriate only in the case of prerecorded media such as CDs, DVDs or videos. It is possible to ensure here that a playback device can in fact actually receive all the partial secret codes.

According to the second variant, k of n partial secret codes must be collected. This variant is recommended for radio broadcasts, because a customer may turn on the broadcast later and thus would not have an opportunity to collect the partial secret codes. If the listener turns on the program only after the advertising break, he must either wait a certain "penalty time" until he has collected enough partial secret codes outside of the advertising break or he must retrieve the session key from a server online.

The way the partial secret codes are introduced into the data depends on the medium. An implementation by using digital watermarks is also conceivable.

Another variant involves inserting the following as additional digital information:

In this case the partial secret codes are represented as specific parts of the additional program information on a digital level, e.g., as part of the service information (SI) in digital television according to DVB, as additional information in the data part of DVD (encryption by CSS algorithm) or as a separate IP packet in IP-based streaming applications.

Another variant involves insertion of a watermark.

In this case the data is contained as a watermark in the content itself. This prevents scanning of the additional digital information using auxiliary programs. The complexity required by such scanning would be equivalent to displaying the content and would not yield any advantages.

New products may be implemented with the help of the invention described here:

Terminals for receiving certain cable programs or advertising-financed broadcasts and/or playback devices for recordings containing advertising blocks, Free giveaway DVDs, MPEG-CDs, audio CDs financed by advertising inserts (e.g., a DVD about the history of cycling interrupted by Telecom advertising blocks on Team Telecom as a present at the T points, or the new James Bond movie in which, each time a BMW appears in the movie, the corresponding advertising block for this model is blended in).

Advertising-financed content for TV Anytime.

What is claimed is:

1. A method for financing multimedia content through advertising, comprising:
    playing back advertising blocks between uses of the content so to finance use of the content by the advertising;
    variably selecting predefined locations for embedding code elements of a key in the advertising blocks, the key being configured for decryption of the content that follows;
    embedding the code elements in the variably selected predefined locations;
    scanning and collecting the embedded code elements during the playing back of the advertising blocks;
    linking the code elements schematically to form the key;
    encrypting the content using the key so that a use of the content depends on at least one of a subset of the code elements determined by the advertiser and the key.

2. The method as recited in claim 1 further comprising blocking the use of the content if the subset of code elements is not obtained.

3. The method as recited in claim 1 wherein the selecting is performed so as to select the predefined locations randomly.

4. The method as recited in claim 1 wherein the code elements include partial secret codes of a shared secret system, the partial secret codes being combinable to form a complete secret code, an extent of the complete secret code being predeterminable.

5. The method as recited in claim 4 wherein the partial secret codes are represented in the advertising blocks as at least one special part of an additional program information on a digital level.

6. The method as recited in claim 5 wherein the additional program information includes at least one of service information in DVB digital television, additional information in a data part of DVD, and as a separate IP packet in an IP application.

7. The method as recited in claim 1 wherein the key is represented in the advertising blocks as a special part of an additional program information on a digital level.

8. The method as recited in claim 7 wherein the additional program information includes at least one of service information in DVB digital television, additional information in a data part of DVD, and as a separate IP packet in an IP application.

9. The method as recited in claim 1 wherein the embedding is performed by inserting the at least one of the key and the code elements as a watermark into the content.

10. A device for financing multimedia content through advertising, comprising:
    a terminal configured to play back advertising blocks between uses of the content, the advertising blocks being stored or transmitted;
    a decryption device configured to control collection of code elements of a key, the key being configured for decryption of the content that follows, the code elements being embedded in variably selected predefined locations in the advertising blocks; and
    a blocking circuit connected to the decryption device and configured to release the content only if the advertising blocks are fully played back.

11. The device as recited in claim 10 wherein the advertising blocks are issued under preferential conditions.

12. The device as recited in claim 10 wherein the content is encrypted using the key so that a use of the content depends on at least one of a subset of the code elements determined by the advertiser and the key.

13. The device as recited in claim 10 wherein the code elements are linked schematically to form the key.

14. The device as recited in claim 10 wherein the predefined locations are selected randomly.

15. The device as recited in claim 10 wherein the code elements include partial secret codes of a shared secret system, the partial secret codes being combinable to form a complete secret code, an extent of the complete secret code being predeterminable.

16. The device as recited in claim 15 wherein the partial secret codes are represented in the advertising blocks as at least one special part of an additional program information on a digital level.

17. The device as recited in claim 10 wherein the code elements are embedded by being inserted as a watermark into the content.

18. A method for financing multimedia content through advertising, comprising:
    playing back advertising blocks between uses of the content so to finance use of the content by the advertising;

embedding code elements of a key in predefined locations in the advertising blocks, the key being configured for decryption of the content that follows;

scanning and collecting the embedded code elements during the playing back of the advertising blocks;

linking the code elements schematically to form the key; and encrypting the content using the key so that a use of the content depends on at least one of a subset of the code elements determined by the advertiser and the key;

wherein the key is represented in the advertising blocks as a special part of an additional program information on a digital level.

19. The method as recited in claim 18 wherein the additional program information includes at least one of service information in DVB digital television, additional information in a data part of DVD, and as a separate IP packet in an IP application.

20. The method as recited in claim 18 wherein the embedding is performed by inserting the at least one of the key and the code elements as a watermark into the content.

* * * * *